Jan. 29, 1952     P. SCHNEEWEISS     2,583,887
PIEPAN SUPPORT
Filed March 14, 1949
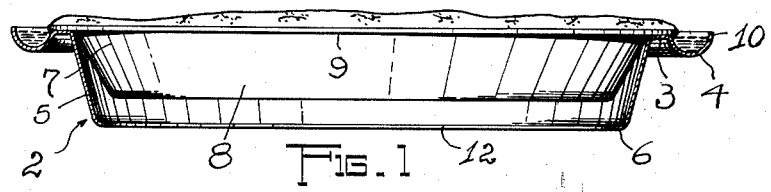
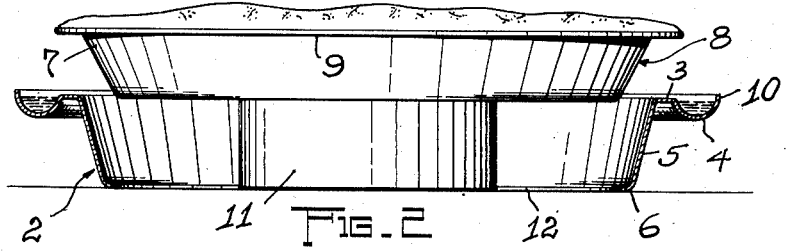
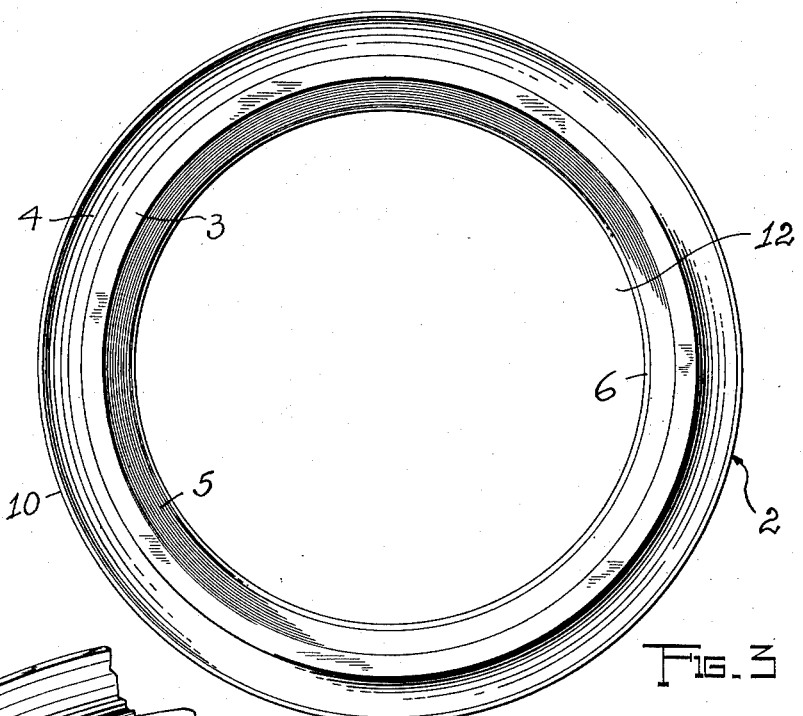
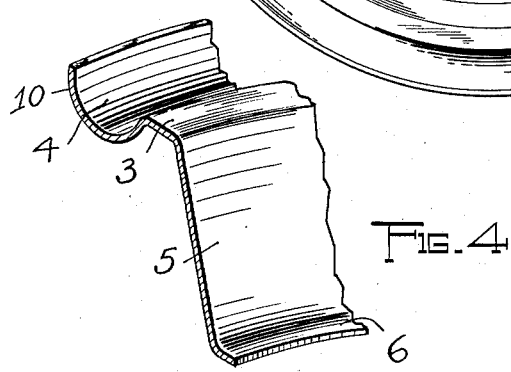
INVENTOR.
PETER SCHNEEWEISS Patented Jan. 29, 1952

2,583,887

UNITED STATES PATENT OFFICE 2,583,887

PIEPAN SUPPORT

Peter Schneeweiss, Cleveland, Ohio

Application March 14, 1949, Serial No. 81,327

1 Claim. (Cl. 126—385)

The present invention relates in general to devices for supporting shallow cooking or baking utensils, and, more particularly to devices for supporting pie pans in pie baking operations.

The primary object of the invention is the provision of a pie pan support in the form of a ring-shaped structure which includes adjacent to the upper edge of its inner circumferential wall a horizontal flange or rim portion adapted to form a seat for the common circumferential flange of a pie pan and simultaneously substantially fluid-tightly seal the pie pan flange to the support, and which in addition includes adjacent to the said horizontal flange or rim portion a trough-shaped, annular portion adapted to receive any overflow juices and material oozed out of a pie in pie baking operations, all for the purpose of preventing running of such juices and material into the oven.

Another object of the invention is the provision of a pie pan support in the form of a ring-shaped structure which includes a horizontal flange or rim portion, an annular trough portion encircling said rim portion, and a circumferential, substantially vertically arranged supporting wall extended downwardly from the inner edge of said horizontal flange or rim portion, said circumferential wall supporting said flange and trough in elevated position and having a height greater than the depth of a pie pan suspended from said support by resting the circumferential flange of the pie pan on the horizontal flange or rim portion and effecting gravity-actuated, substantially fluid-tight sealing between said horizontal flange and the flange of the pie pan.

The above and additional objects and novel features of construction, combination and relations of parts by which the objects in view have been attained, will appear and are set forth in detail in the course of the following specification.

The drawing accompanying and forming part of the specification illustrates a certain practical embodiment of the invention, but it will be apparent as the specification proceeds that the structure may be modified and changed in various ways without departure from the true spirit and broad scope of the invention.

In the drawing:

Fig. 1 is a transverse sectional view through a ring-shaped pie pan support constructed in accordance with the invention, the support being shown carrying a pie pan with a pie and the trough-shaped portion of the support having accumulated therein juice and pie material oozed out of the pie pan during pie baking operations;

Fig. 2 is a transverse sectional view, partly in elevation, similar to Fig. 1, showing the pie pan partly removed from the ring-shaped pie pan support by a wooden block on which the pie pan is seated to effect removal of the pan from the support;

Fig. 3 is a plan view of the ring-shaped pie pan support; and

Fig. 4 is an enlarged fragmentary sectional view through the ring-shaped pie pan support.

Referring now more in detail to the exemplified form of the invention shown in the drawings, reference numeral 2 denotes a pie pan supporting device which is shaped substantially as shown, with a ring-shaped body including a horizontal rim portion 3, a trough-shaped annular portion 4 extended from the outer circumferential edge of rim portion 3, and an inwardly inclined, circumferential wall 5 extending at an inclination from the inner circumferential edge of rim portion 3. The circumferential wall 5, which has its lower edge 6 turned inwardly to circumferentially stiffen said edge, supports rim portion 3 and trough-shaped annular portion 4 in such elevated position that a pie pan will be suspended from the device as wall 5 has greater height than the depth of the pie pan to be suspended. Rim portion 3 is dimensioned to encircle and loosely fit the upper portion of the circumferential wall 7 of the pie pan 8 to permit free resting of the circumferential flange 9 of such pan on rim portion 3 and provide circumferential contact between said rim portion and the flange of the pie pan, all as shown in Fig. 1. The circumferential contact between the flange of the pie pan and the rim portion of the device provides a gravity-actuated, substantially fluid-tight seal between said flange and rim portion, and insures that overflow juice and pie material oozed from the thus supported pie pan is accumulated in the trough-shaped annular portion 4 of the device to prevent running of such juice and pie material into the oven or between the pie pan and its support.

Preferably, as shown, outer wall 10 of the trough-shaped annular portion 4 is extended somewhat above rim portion 3 to avoid in pie baking operations juices from being splashed over such wall into the oven.

After baking operations in which the trough-shaped annular portion 4 has accumulated all overflow material, a pie pan is readily and easily removed from the device by resting the pie pan on a round block 11 and forcing the device downwardly (see Fig. 2). The diameter of this block, of course, is smaller than the opening 12 at the bottom of the device so that block 11 can readily be extended through said opening and the device forced downwardly to separate the pie pan from the supporting device.

Having thus described my invention, what I claim is:

As an article of manufacture a pie pan support embodying a substantially ring-shaped body having a continuous, flat horizontally arranged rim flange, an integral, vertically elongated, continuous inwardly inclined, annular supporting wall extended downwardly from the inner edge of said rim flange adapted to suspend a pie pan, a flat, continuous, integral circumferential flange extended inwardly from the bottom of said wall, and an integral, continuous annular trough extended outwardly from the outer edge of the said flat rim flange circumferentially thereof.

PETER SCHNEEWEISS.

REFERENCES CITED

The following references are of record in the file of this patent:

UNITED STATES PATENTS

| Number | Name | Date |
|---|---|---|
| 1,509,445 | Schwartz | Sept. 23, 1924 |
| 1,612,551 | Twohey | Dec. 28, 1926 |
| 1,957,013 | Howard | May 1, 1934 |
| 1,974,443 | Bean | Sept. 25, 1934 |
| 2,220,069 | Farwig | Nov. 5, 1940 |
| 2,282,400 | Ginnel | May 12, 1942 |
| 2,501,799 | Vredenburg | Mar. 28, 1950 |